Sept. 26, 1950  B. R. JONES ET AL  2,523,375
SPRING SEAT
Filed Sept. 7, 1946

INVENTORS
BERT R. JONES
GEORGE L. GOEBEL
BY Rodney Bedell
ATTORNEY

Patented Sept. 26, 1950

2,523,375

UNITED STATES PATENT OFFICE 2,523,375

SPRING SEAT

Bert R. Jones, West Haven, and George L. Goebel, Hamden, Conn.

Application September 7, 1946, Serial No. 695,342

5 Claims. (Cl. 267—4)

The invention relates to equalized railway trucks and, particularly, to a spring seat to support the equalizer springs.

One object of the invention is to adjust the spring seat to compensate for wheel wear and permanent set of equalizer and bolster springs without removing the equalizer springs from the truck. This is accomplished by providing a jacking plate which supports the equalizer spring in a spring seat member carried by the equalizer. A jack, with or without a supplemental fixture, is applied to the jacking plate to raise the plate relative to the spring seat member whereby shims may be inserted between the plate and the member.

Other objects will be apparent to those skilled in the art from the following description and accompanying drawing, in which Figure 1 is a side view of a four wheel railway truck including an equalizer spring seat constructed according to the invention. A part of the nearer wheel piece and equalizer structure is broken away to show the bolster and its supporting members at the opposite side of the truck.

Figure 1:
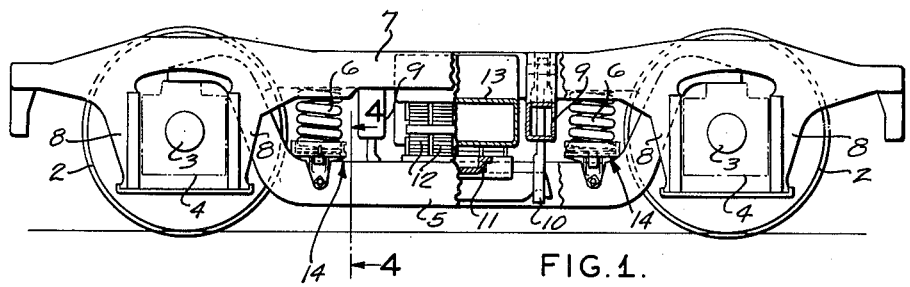

The truck includes wheels 2, axles 3, journal boxes 4, equalizers 5, truck springs 6, a truck frame 7 having depending pedestals 8, transverse transoms 9, inside swing hangers 10 suspended from the transoms, and a spring plank 11 carrying elliptic springs 12 which support the truck bolster 13. All of the above parts are of familiar construction and operation.

Mounted on equalizer 5 and seating spring 6 is a spring seat 14, the subject matter of the present invention. The spring seat 14 shown in Figures 1 to 4 comprises a cup-shaped member 15 having an upwardly extending circumferential flange 16 to prevent lateral shifting of spring 6 and having a downwardly facing area resting on the equalizer. Flange 16 has a window 31 at the side of member 15 in alignment with equalizer 5, for the purpose described below. Member 15 has spaced downwardly extending legs 17 and 18 at the sides of the equalizer-engaging area adapted to receive equalizer 5 between them. Leg 18 is longer than leg 17 and is attached rigidly to equalizer 5 by a bolt 19. A pair of vertical ribs 20 extend downwardly from the bottom of member 15 to leg 17 and a pair of vertical ribs 21 extend downwardly from the bottom of member 15 to leg 18, for additional strength. Positioned within member 15 and supported thereby is a jacking plate 22 which supports coil spring 6. Jacking plate 22 has a pair of lugs 23 extending downwardly through openings 24 in the bottom of member 15 and between ribs 20 and ribs 21. Lugs 23 straddle equalizer 5.

Figures 2, 4:
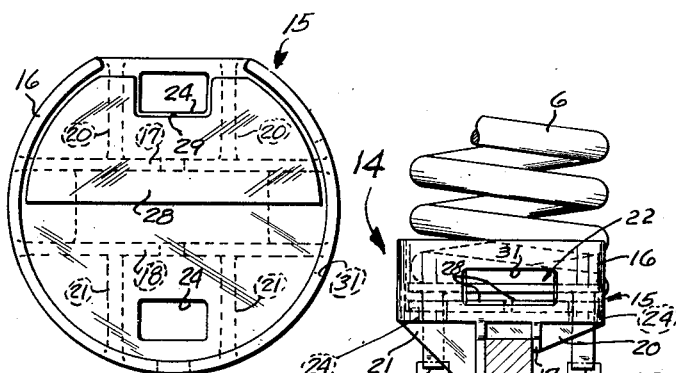
Figure 2 is a top view of the spring seat member shown in Figure 1, and drawn to an enlarged scale, and showing one shim assembled therewith.
Figure 4 is a detail section on the line 4—4 of Figure 1 showing the jacking fixture applied to the jacking plate and drawn to a smaller scale than Figures 2 and 3.

When it is necessary to adjust the car height to compensate for wheel wear or permanent set of truck springs or for some other reason, a U-shaped jacking fixture 25 is applied with its legs 26 extending upwardly into engagement with downwardly extending lugs 23 of jacking plate 22. A jack 30 is applied to the horizontal portion 27 of the fixture and jacking plate 22 and coil spring 6 are raised relative to member 15 as indicated in Figure 4. When there is sufficient clearance between jacking plate 22 and the bottom of the window in member 15, semi-circular shims 28, having a width less than the length of window 31, are inserted through the window and beneath jacking plate 22 and are moved laterally in opposite directions against the inner periphery of flange 16 to form a circular spring seat, each shim assuming a position as indicated at one side of Figure 2 in which the shim recess 29 receives one of the jacking plate lugs 23. As many pairs of shims are inserted as are required to raise the spring and parts carried thereby to the desired height. Then the jacking plate is lowered onto the shims. Hence the height of the railway vehicle may be adjusted without removing the equalizer springs.

Window 31 for inserting the shims between the bottom of member 15 and jacking plate 22 is located above the equalizer and adjacent the bolster. If other type trucks are used, as for example, trucks with double equalizer bars at each side of the truck or with the swing hangers on the outside of the equalizer and where shims cannot be inserted from the position shown, the window can be placed in any convenient position as long as the window is not blocked by lugs 23. If double equalizers are used, a single lug at the center of the jacking plate or longitudinally spaced lugs may be positioned between the equalizers and the window can face towards the side of the truck. Although the drawing shows a truck including a single equalizer spring at each end of the equalizer, the spring seat can be arranged to mount a plurality of springs.

Figure 5:
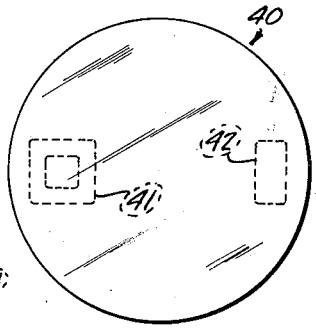
Figure 5 is a top view of another form of jacking plate constructed according to the invention.
Figure 3:
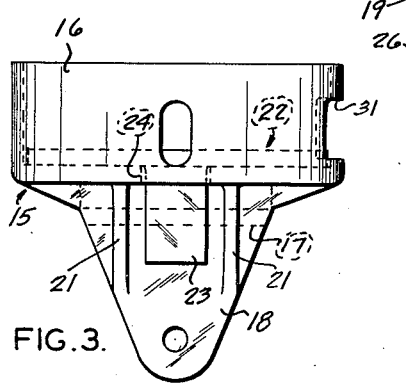
Figure 3 is a front view of the spring seat member with the jacking plate assembled therewith.
Figure 6:
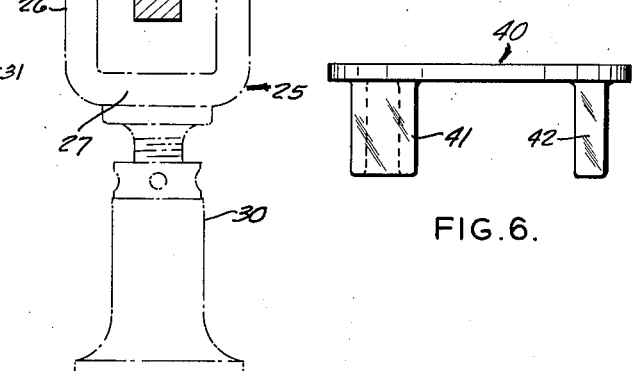
Figure 6 is a side view thereof.

The jacking plate 40 of Figures 5 and 6 is similar to jacking plate 22 shown in Figures 3 and 4 except that lug 41 of jacking plate 40 is substantially thicker than lugs 23 of jacking plate 22. When the spring seat is assembled, lug 41 preferably is positioned outside of the equalizer and is arranged for direct engagement by a jack to raise jacking plate 40 relative to the spring seat member so that shims may be applied therebetween. Lug 42 prevents relative rotation of the jacking plate and spring seat member and guides the plate vertically as it is raised and lowered relative to the member. Jacking plate 40 is so rigid that it will not bend and lug 41 is so wide that the plate does not tilt appreciably under its load when a jack is applied to the lug.

The details of the above-described structure may be varied from those shown without departing from the spirit of the invention and the exclusive use of those modifications coming within the scope of the claims is contemplated.

What is claimed is:

1. In a railway vehicle truck including an equalizer and a truck frame, a cup-shaped member mounted on the equalizer and having a pair of downwardly extending spaced legs receiving the equalizer between them, at least one of said legs being attached to the equalizer, a pair of ribs connecting the bottom wall of said member and each of said legs, said member having a pair of spaced openings in its bottom wall, each positioned between the ribs of one of said pairs and at the side of the equalizer, a jacking plate in said member, an equalizer spring with its lower end received in said member and mounted on said plate and supporting said truck frame, said jacking plate having a pair of lugs extending downwardly through said openings in said member and straddling the equalizer, said lugs being arranged for engagement by jacking structure beneath the equalizer to raise said plate and the load thereon relative to said member, there being a window in the side of said member for applying shims between the bottom of said member and said jacking plate when said plate is raised relative to said member without disassembling said plate and member.

2. A device for mounting a railway truck frame-supporting spring on a truck equalizing bar, comprising a cup-like member having a bottom wall and a pair of legs extending outwardly therefrom and spaced apart to receive an equalizing bar between them, said member having a pair of spaced openings in its bottom wall, the distance between said openings being at least as great as the distance between said legs, a jacking plate received in said member and forming a spring seat and having a pair of lugs extending downwardly through said openings, there being a window in the side of said member adjacent to said bottom wall and spaced angularly from said openings, and a shim insertible through said window between the bottom of said member and said jacking plate, when said plate is moved from the bottom of said member, without disassembling said member and plate.

3. A device for mounting a railway truck frame-supporting spring on a truck equalizing bar, comprising a cup-like member having a bottom wall with an exterior face arranged for application to an equalizing bar, there being openings in said bottom wall adjacent opposite sides of the member, a jacking plate received in said member and forming a spring seat and having lugs extending downwardly through said openings, there being a window in the side of said member adjacent to said bottom wall and spaced angularly from said openings, and a shim insertible through said opening and between the bottom of said member and said jacking plate, when said plate is moved from the bottom of said member, without disassembling said member and plate.

4. A device for mounting a railway truck frame-supporting spring on a truck equalizing bar, comprising a cup-like member having a bottom wall with an exterior face arranged for application to an equalizing bar, there being an opening in said bottom wall adjacent to the side of said member, a jacking plate received in said member and forming a spring seat and having a lug extending downwardly through said opening, there being a window in the side of said member adjacent to said bottom wall and spaced angularly from said opening, and a shim insertible through said opening between the bottom of said member and said jacking plate, when said plate is moved from the bottom of said member, without disassembling said member and plate.

5. A device for mounting a railway truck frame-supporting spring on a truck equalizing bar, comprising a cup-like member having a circular bottom wall with an exterior face arranged for application to an equalizing bar, there being an opening in said bottom wall adjacent to the side of said member, a jacking plate received in said member and forming a spring seat and having a lug extending downwardly through said opening, an upstanding wall about the circumference of said bottom wall, there being a rectangular window-like opening in said upstanding wall spaced angularly from said opening in the bottom wall and having a width approximately equal to one-half of the diameter of said bottom wall and having a lower edge substantially flush with the top of said bottom wall and having a top edge spaced from said bottom edge to receive a shim edgewise when the jacking plate is moved away from the bottom of said member.

BERT R. JONES.
GEORGE L. GOEBEL.

REFERENCES CITED

The following references are of record in the file of this patent:

UNITED STATES PATENTS

| Number | Name | Date |
| --- | --- | --- |
| 1,105,096 | North | July 28, 1914 |
| 1,706,494 | Martin | Mar. 26, 1926 |
| 1,779,157 | Batz | Oct. 21, 1930 |
| 2,094,569 | Dwyer | Sept. 28, 1937 |
| 2,139,592 | Kirby | Dec. 6, 1938 |

FOREIGN PATENTS

| Number | Country | Date |
| --- | --- | --- |
| 257,844 | Italy | Mar. 20, 1928 |